(12) United States Patent
Sheng et al.

(10) Patent No.: US 9,554,086 B1
(45) Date of Patent: Jan. 24, 2017

(54) TRUE MOTION VECTOR EDITING TOOL

(71) Applicant: Pixelworks, Inc., Portland, OR (US)

(72) Inventors: Xiaojie Sheng, Shanghai (CN); Neil Woodall, Newport Beach, CA (US); Bob Zhang, Santa Clara, CA (US); Guohua Cheng, Shanghai (CN); Yue Ma, Pleasanton, CA (US)

(73) Assignee: PIXELWORKS, INC., Portland, OR (US)

( * ) Notice: Subject to any disclaimer, the term of this patent is extended or adjusted under 35 U.S.C. 154(b) by 234 days.

(21) Appl. No.: 14/146,968

(22) Filed: Jan. 3, 2014

(51) Int. Cl.
*H04N 19/553* (2014.01)
*H04N 7/01* (2006.01)

(52) U.S. Cl.
CPC ............ *H04N 7/014* (2013.01); *H04N 19/553* (2014.11)

(58) Field of Classification Search
CPC .... H04N 7/014; H04N 19/137; H04N 19/139; H04N 19/14; H04N 19/51; H04N 19/513; H04N 19/537; H04N 19/553
See application file for complete search history.

(56) References Cited

U.S. PATENT DOCUMENTS

| | | | | |
|---|---|---|---|---|
| 5,694,487 A | * | 12/1997 | Lee | H04N 19/54 375/240.14 |
| 5,999,651 A | * | 12/1999 | Chang | G06T 7/2033 382/199 |
| RE42,790 E | * | 10/2011 | Schonfeld | G06T 7/2006 375/240.16 |
| 2012/0044998 A1 | * | 2/2012 | Kokaram | G06T 7/2006 375/240.16 |

* cited by examiner

*Primary Examiner* — Christopher Findley
(74) *Attorney, Agent, or Firm* — Marger Johnson

(57) ABSTRACT

A method of generating motion vectors for image data includes identifying boundaries of at least one object in original frames of image data, performing object motion analysis based upon the boundaries, performing pixel-level motion layer generation, using the object motion analysis and the pixel-level motion layers to generate motion for blocks in the image data, and producing block level motion information and layer information for the original frames of image data.

11 Claims, 10 Drawing Sheets

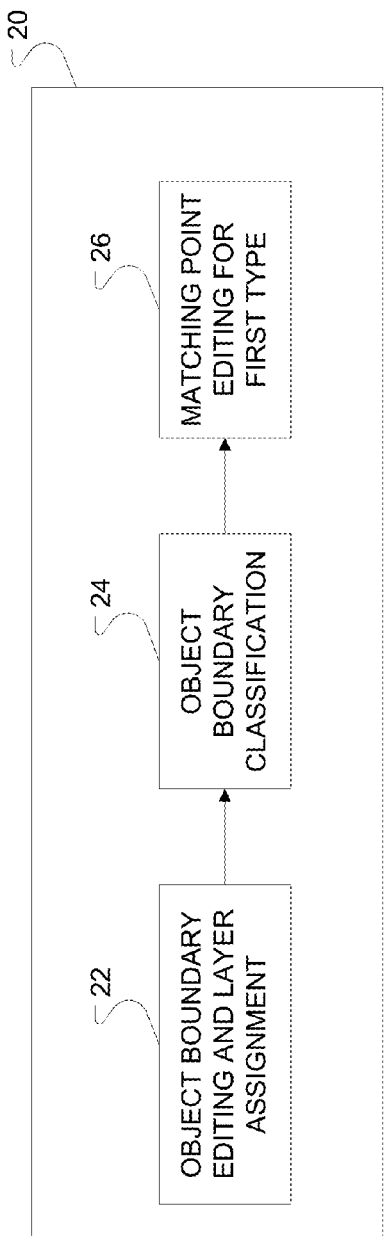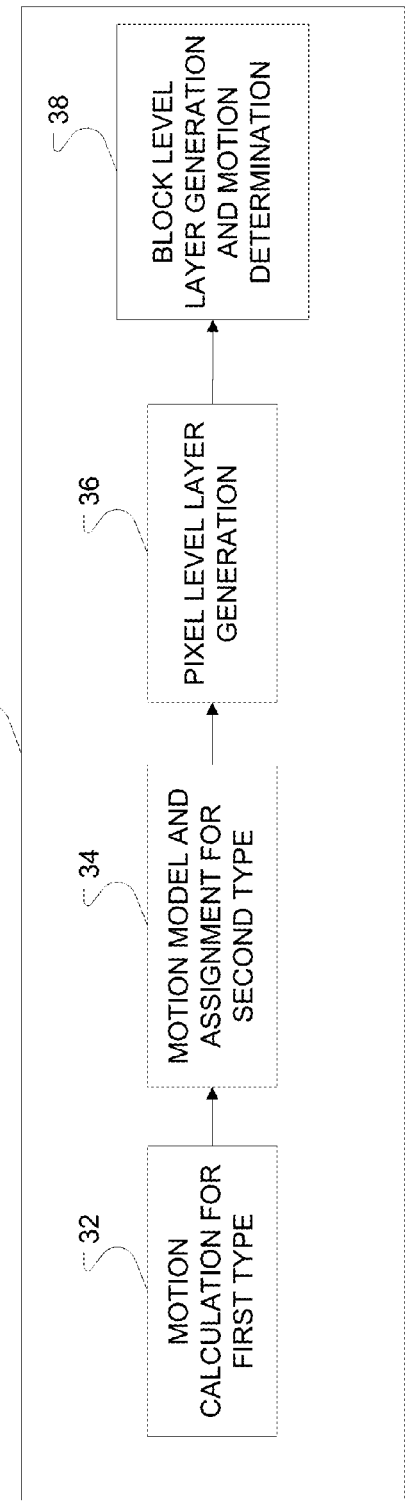

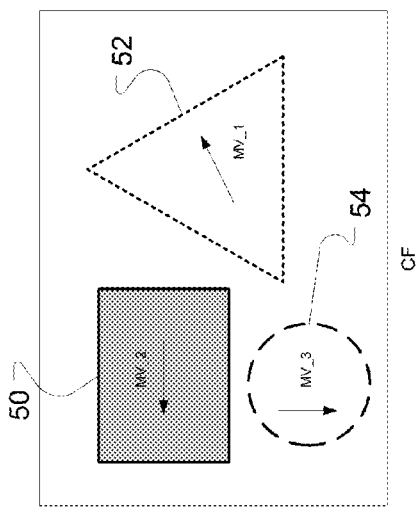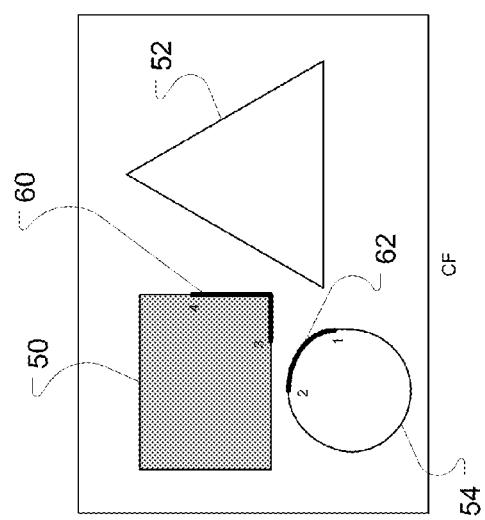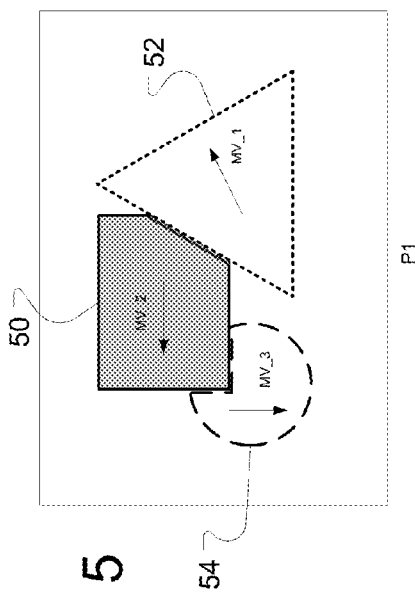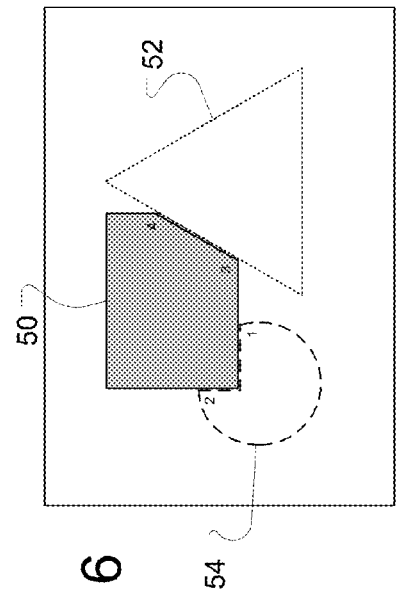
FIGURE 5
FIGURE 6

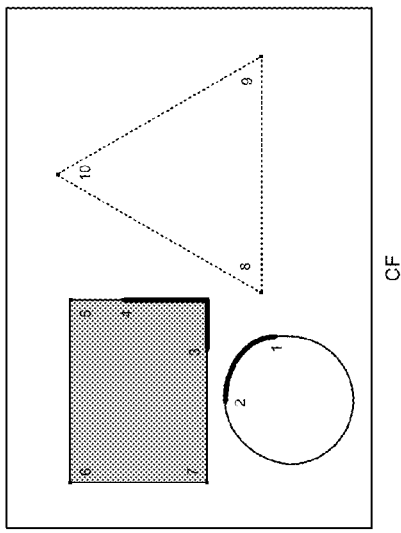
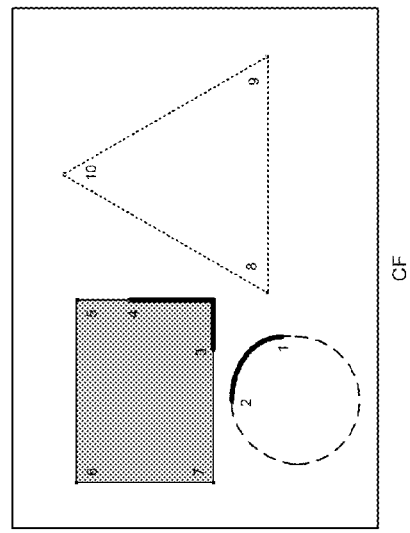
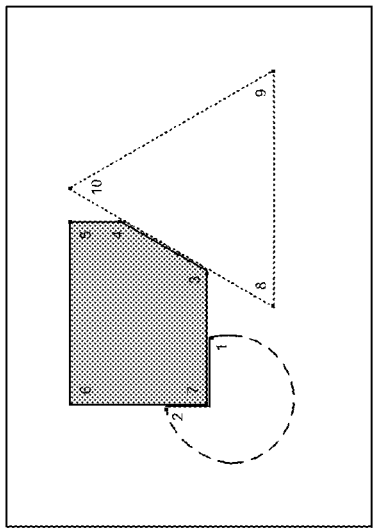
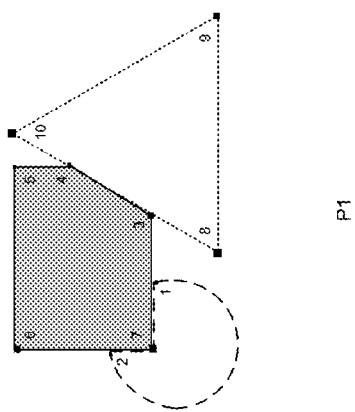
FIGURE 7
FIGURE 8

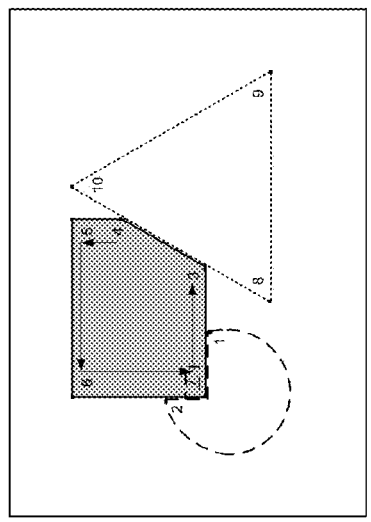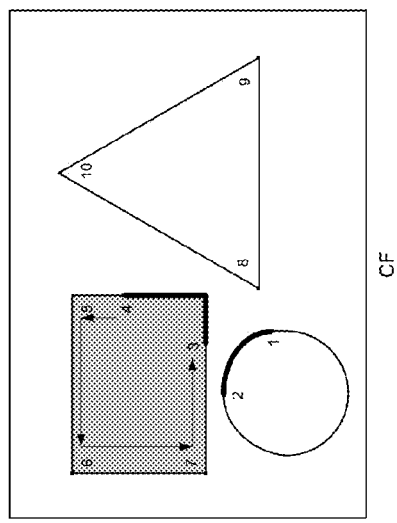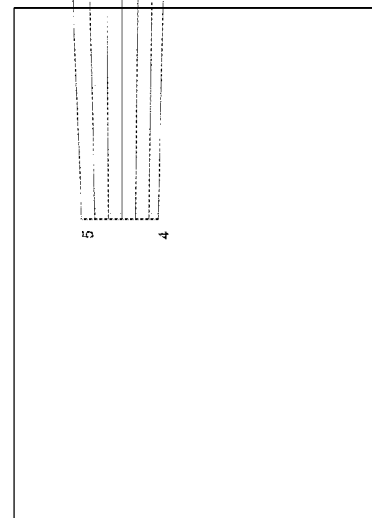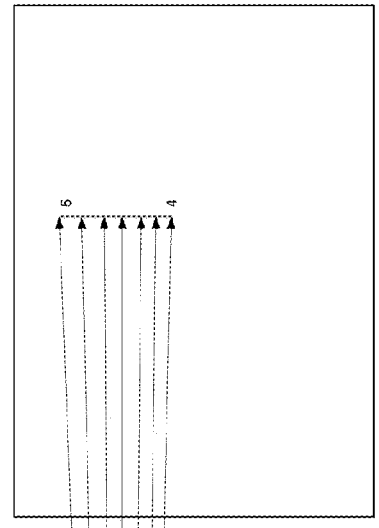
FIGURE 9
FIGURE 10

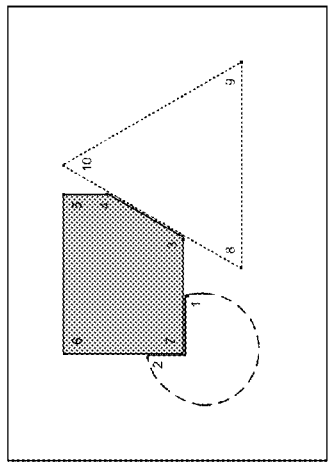
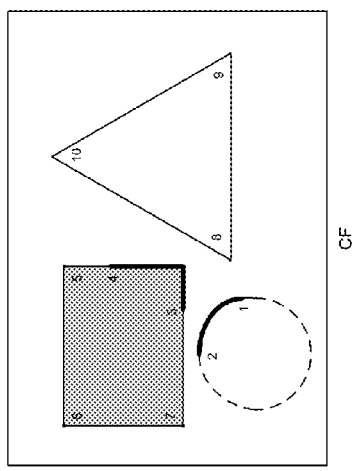
FIGURE 11
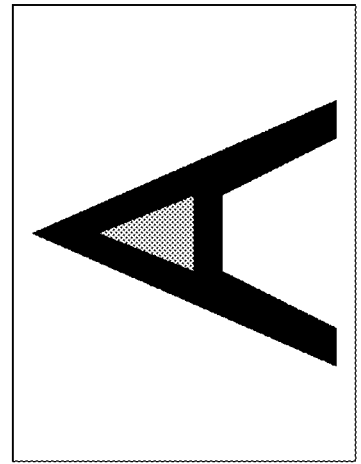
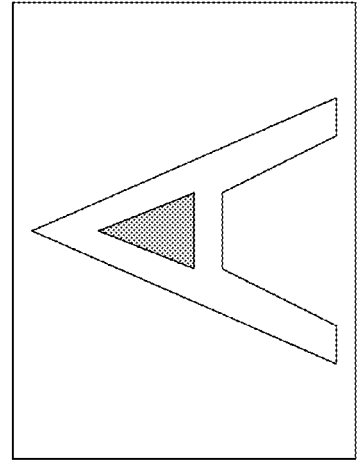
FIGURE 12

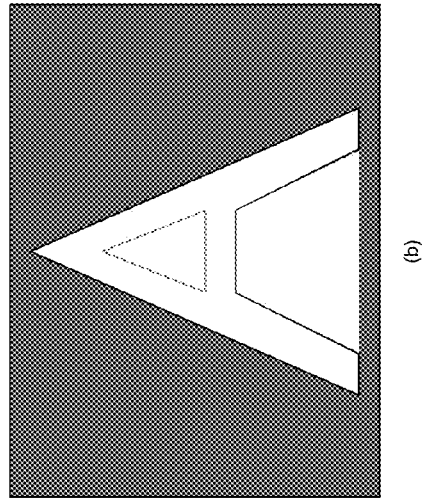
FIGURE 13
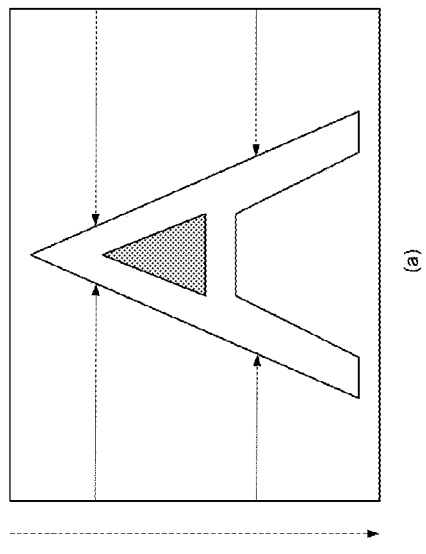
FIGURE 14
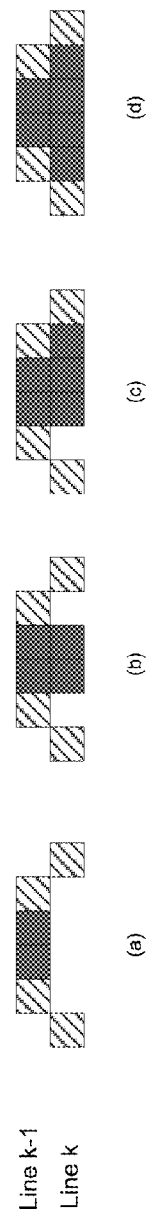

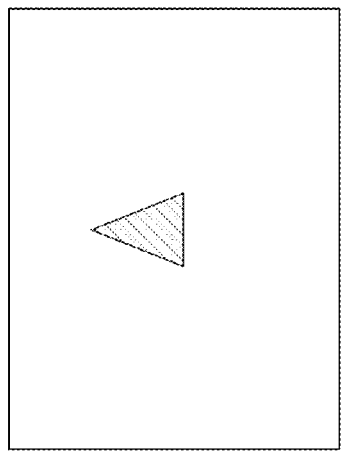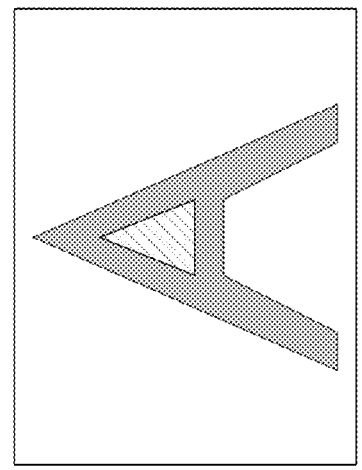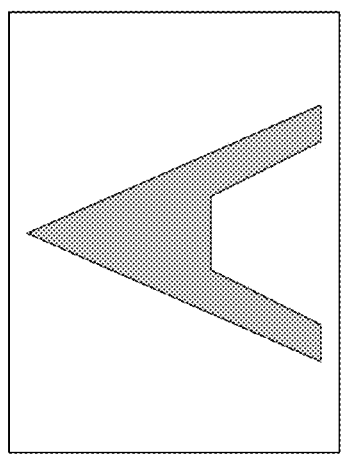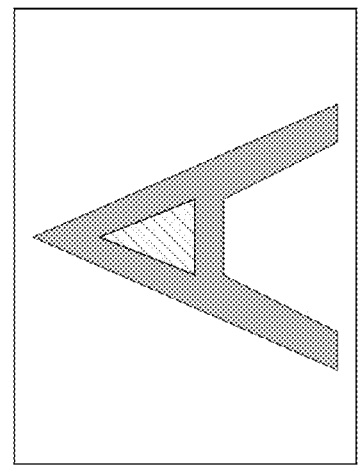
FIGURE 15
FIGURE 16

TRUE MOTION VECTOR EDITING TOOL

BACKGROUND

Conversion from lower frame rates to higher frame rates typically involves frame interpolation. Frame interpolation generates frames between existing frames in the lower frame rate data to achieve the higher frame rate. The frame interpolation process relies upon motion vectors between the two frames to generate the data with the appropriate motion in the data. Using the most accurate motion vectors results in higher video quality.

True motion base frame interpolation typically results in good video quality improvement. Current state-of-the-art automatic motion vector calculations result in interpolation frames with artifacts. It is possible to use true motion by editing the motion and then use that motion for interpolating a frame of interpolation data.

BRIEF DESCRIPTION OF THE DRAWINGS

FIG. 3 shows a block diagram of a boundary module in an embodiment of a true motion editing tool.

FIG. 4 shows a block diagram of an embodiment of a motion estimation and layer generation module.

FIG. 5 shows a graphical representation of a pair of original frames.

FIG. 6 shows a graphical representation of boundaries in a pair of original frames.

FIG. 7 shows a graphical representation of types of boundaries in a pair of original frames.

FIG. 8 shows a graphical representation of matching points on boundaries of objects in a pair of original frames.

FIG. 9 shows a graphical representation of line matching for an object in a pair of original frames.

FIG. 10 shows a graphical representation of line matching between pair of original frames.

FIG. 11 shows a graphical representation of a boundary in a first frame without corresponding points in a second frame.

FIG. 12 shows a graphical representation of object layer boundaries.

FIG. 13 shows a graphical representation of scanning image data to perform layer assignment.

FIG. 14 shows examples of boundary and layer pixels in a line of pixels.

FIG. 15 shows a graphical representation of image layers.

FIG. 16 shows a graphical representation of layer assignments in image data.

DETAILED DESCRIPTION OF THE EMBODIMENTS

The embodiments discussed here generate motion vectors based on the boundaries of objects. While some of the embodiments here may discuss in terms of a user interface in which the user manually edits the selection of the boundaries of the objects. The discussion uses this for ease of understanding, with the advent of sophisticated edge and boundary detections processes, the detection of boundaries of objects will performed automatically.

The approach discussed here uses motion fields only for original frames in the incoming image data because image data does not exist for the interpolated phase unless the process has already generated the motion field and used it to create the image data. Therefore, one cannot directly generate the motion field at an interpolated phase manually or automatically based on the boundaries of objects.

Figure 1:
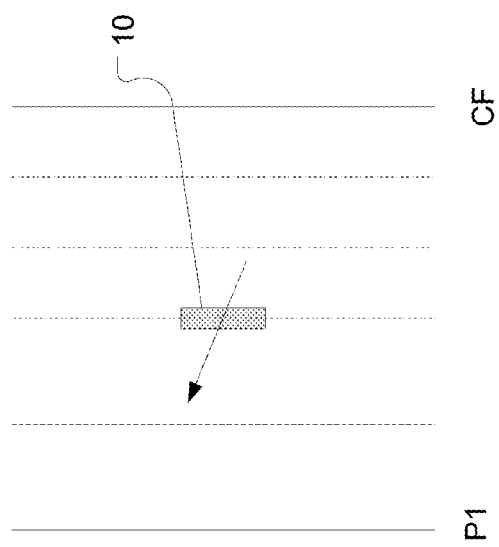
FIG. 1 shows a graphical representation of a block in an interpolation phase of image data.

Motion based frame interpolation requires motion vectors at the interpolated frame position to do frame interpolation. As illustrated in FIG. 1, for a block 10 in the interpolation phase, one should get its true motion to retrieve interpolation pixel from the P1 and CF frames. In the motion editing tool discussed here, it uses the input of object boundaries to allow manual or automated editing on the motion fields co-located with P1 and CF. The motion vector interpolation process will then automatically calculate the true motion fields at the interpolation phase. Therefore, the method will largely reduce the workload for a user to edit the motion because the user does not need to edit the motion at the interpolation phase.

Figure 2:
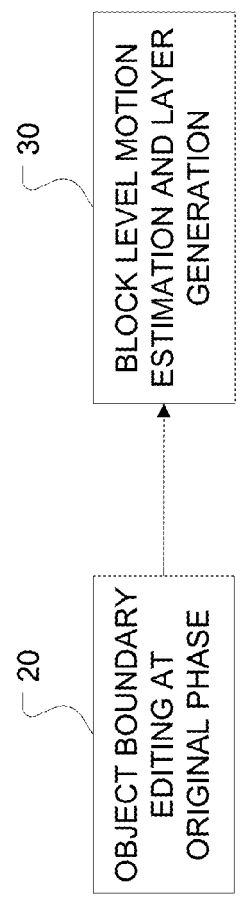
FIG. 2 shows a block diagram of an embodiment of a true motion editing tool.

The framework of the true motion editing tool includes two main modules which are illustrated in FIG. 2. Module 20 handles object boundary identification at the original phase. Currently this portion requires manual input to be accurate enough. However, the accuracy of automatic identification of objects and their boundaries is rapidly improving, so at some point this may not require user input. In this module, the object boundary, object layer and some feature points on the object boundary are identified. The second module (30) will do automatic block level motion estimation and layer generation at original phase. Based on the boundary information in the first module, the second module will automatically calculate the block level motion and layer information inside the defined object at original phase. After module 30, all the information needed for frame interpolation of the original frame can be calculated and the output can be directly used by a motion vector interpolation module to interpolate the frame at any phase.

FIG. 3 shows a more expanded view of the object boundary module 20. Module 22 is for object boundary editing and layer assignment. In this module, the tools will provide the user with an interface to draw the object boundary and identify the layer to which the object belongs. In the true motion editing tool, the object definition is based on the motion model. This means that all the pixels inside an object should belong to the same motion model. For example, if a frame contains a car, the process should not define the whole car as a single object because the car body and the wheel belong to the different motion model. Instead, the process would define different objects for car body and car wheel. In module 22, the user would first define the objects with the above motion model criteria and then draw the boundary of the objects to define the layer each object belongs to. In the user-based editing, the different layers would be laid out as different colors. The matching of color and layer would be pre-defined by the tool.

For example, in FIG. 5, the first layer object with dotted lines, the object closest to the viewer 52, the second layer object 50 in gray and the dashed line for the third layer object 54, etc. In colors, the first object would be blue, the second would be red and the third would be green. It is also possible to automatically determine the motion layers. For example the copending application, "Clustering Based Motion Layer Detection for Frame Interpolation and 2D-3D Conversion," U.S. patent application Ser. No. 13/917,899, can rank order motion layers for the object, similar to the clustering case.

FIG. 5, also illustrates one pair of original frames as P1 and CF. The frames contain three objects, each with a different motion model. The object 52 is in the first layer, the object 50 is in the second layer and the object 54 is in the third layer.

In module 22, the user should use the drawing tool of the true motion editing tool to draw the boundary of different objects with different color. An automated tool could do the same. As illustrated in FIG. 6, after drawing, in both P1 and CF, the boundary of the three objects has been defined in different lines and gray to represent the layer information. The module 24 will further classify the boundaries into one of two types. The first type of boundary is a double confirmed boundary, meaning that it can be seen in both P1 and CF. These are those boundaries in the areas where foreground objects do not overlap. The second type of boundary is a cover/uncover boundary, shown in CF of FIG. 6 as boundaries 60 and 62.

The boundary FIG. 7 shows that the first type of boundary can find the corresponding boundary at the other frame. The first type of boundary can be seen by the lines from 2-6, 6-5, 5-4, 3-1, 8-9, 3-8, 9-10, and 10-4. The second type of boundary such as from 1-7, 7-2, and 3-4 only exists in one frame.

As the process has defined the object boundary type in P1 and CF in module 24, in module 26, the user will edit the matching points for the first type boundary. The matching points refer to some points on the first type boundary and the process can find their corresponding points at the other frame. For example, FIG. 8 illustrates the matching points at P1 and CF frame for the first type boundary. In FIG. 8, the black points represent the matching points edited by the user. These points are all on the first type boundary. The number of the point represents the matching point in P1 and CF. The process would use the feature points as the matching points because the feature points are easy to find and accurate to locate. As the automatic feature detection and matching algorithms grow more and more robust, the workload of manual editing will be reduced with the help of automatic processing.

In module 20 of FIG. 2, the user has finished the editing process and in the following module, the true motion editing tool will automatically calculate the motion fields for original frame and interpolation frame in module 30. FIG. 4 shows an expanded view of module 30. In module 32, the process first calculates the motion vectors for the pixels on the first type boundary. The process uses the line matching algorithm to calculate the motion vectors. FIG. 9 illustrates the line matching algorithm for the rectangle object.

As FIG. 9 illustrates, to do line matching, the user will first define a starting point on the first type boundary and also define the next point to show the path direction. For example, in FIG. 9, the process will define point 4 as the starting point and the upper point as the next point of the path to show the direction. The process then automatically finds the whole path as shown in FIG. 9. In the CF frame, the process should do the same thing. After that, the line matching is done as follows.

As shown in FIG. 10, from the starting point and following the direction shown, the process can find a path between the starting point and the next matching point. In FIG. 10, the process finds the boundary between point 4 and point 5 both in P1 and CF and defines it as B_1[4,5], which means the first type boundary between point 4 and point 5. To show the line matching process clearer, FIG. 10 shows the longer path in CF than P1. After the process gets the path, the process will first calculate the path length by counting the number of pixels in the path. The process defines the path length in P1 and CF as Length_P1 and Length_CF. The process define the motion of pixels on path in P1 and CF as:

$$MV\_P1[LS\_P1.x(m), LS\_P1.y(m)].x \; MV\_P1[LS\_P1.x(m), LS\_P1.y(m)].y$$

$$m=[1, Length\_P1]$$

$$MV\_CF[LS\_CF.x(n), LS\_CF.y(n)].x \; MV\_CF[LS\_CF.x(n), LS\_CF.y(n)].y$$

$$n=[1, Length\_CF]$$

In which [LS_P1.x(m), LS_P1.y(m)] represent the x and y coordinates for the m-th pixel on the path in P1 and [LS_CF.x(n), LS_CF.y(n)] represent the x and y coordinates for the n-th pixel on the path in CF.

The process separately calculates the motion for the pixels on path in P1 and CF. For the m-th pixel in P1, the process can then find its corresponding n-th pixel on path in CF by calculating:

$$n=m*Length\_CF/Length\_P1$$

The process then finds the x and y coordinates for the m-th pixel in P1 and the n-th pixel in CF as [LS_P1.x(m), LS_P1.y(m)] and [LS_CF.x(n), LS_CF.y(n)]. Finally the motion of the m-th pixel in P1 is calculated by:

$$MV\_P1[LS\_P1.x(m), LS\_P1.y(m)].x = LS\_CF.x(n) - LS\_P1.x(m),$$

$$MV\_P1[LS\_P1.x(m), LS\_P1.y(m)].y = LS\_CF.y(n) - LS\_P1.y(m).$$

$$m=[1, Length\_P1]$$

After the calculation for all m=[1, Length_P1], the process can get all motion vectors for the path in P1. The calculation for path in CF is similar as follows. For the m-th pixel in CF, the process can find its corresponding n-th pixel on path in P1 by calculating:

$$n=m*Length\_P1/Length\_CF.$$

Then the process finds the x and y coordinates for m-th pixel in CF and n-th pixel in P1 as [LS_CF.x(m), LS_CF.y(m)] and [LS_P1.x(n), LS_P1.y(n)]. Finally the motion of m-th pixel in CF is calculated by:

$$MV\_CF[LS\_CF.x(m), LS\_CF.y(m)].x = LS\_P1.x(n) - LS\_CF.x(m)$$

$$MV\_CF[LS\_CF.x(m), LS\_CF.y(m)].y = LS\_P1.y(n) - LS\_CF.y(m)$$

$$m=[1, Length\_CF]$$

After the process calculates the motion vector for B_1[4,5] both in P1 and CF, the process will automatically continue to calculate the remaining path in the same way until reaching the last point of the first type boundary. For example, the order is as follows: B_1[4,5]→B_1[5,6]→B_1[6,7]→B_1[7,3]. The process finishes the motion calculation for the first type of boundary for the rectangle. The motion calculation for the first type boundary for the circle and triangle is the same as for the rectangle.

In module 32 of FIG. 4, the process has calculated the pixels on all the first boundary types. Now in module 34, the process will calculate the motion for the second boundary types. As the second type of boundary cannot find its corresponding boundary in the other frame, the process cannot use line matching algorithm to calculate the motion. As illustrated in FIG. 11, the second type of boundary cannot find its corresponding path in the other frame.

As the boundary of the same object should belong to the same motion model, the process can first calculate the object motion model through first type boundary and then assign the motion model to the second type boundary in the same object. This process provides two type of motion models: translational model and affine model. The translational model can deal with linear motion, which is most common in video. For more complex motions such as rotation and zooming, the process can apply the affine model. The translational model can be defined as:

$$MV[x,y].x=a1$$

$$MV[x,y].y=a2.$$

The affine model is defined as:

$$MV[x,y].x=a3*x+a4*y+a1$$

$$MV[x,y].y=a5*x+a6*y+a2.$$

In which [x,y] is the coordinate of pixel and MV[x,y].x is the motion in horizontal direction and the MV[x,y].y is the motion in vertical direction. The process for the motion calculation for second type boundary is as follows.

The process finds the object the second type boundary belongs to and collect the motion for all pixels in first type boundary of the object. For example, in FIG. 11, to calculate motion for the second type boundary between point 3 and point 4, it can be defined as B_2[3,4], the process first collects the motion for first type boundary B_1[4,3] in the same object which has already been calculated in module 32 as MV[x_k].x=a_1_m, MV_P1[LS.x(m), LS.y(m)].y=a_2_m. m=[1, Length_P1]. In which Length_P1 is calculated by the number of pixels on B_1[4,3] and [LS.x(m), LS.y(m)] is the x and y coordinate of the m-th pixel of the B_1[4,3].

The process then selects one type of motion model from translational or affine. It uses least square or other suitable method on the motion of first type of boundary to estimate the parameters of the motion model. For example, if the process does not have enough samples or the samples do not differ enough in position from each other which means the affine model would be unstable, the process chooses the translational model and uses least square method on all collect pixel motion on B_1[4,3] to estimate the motion model parameters a1 and a2.

The process applies the calculated motion model to the second type of boundary in the object. For example, for all pixels on B_2[3,4], the process can then apply MV_P1[LS.x (m), LS.y(m)].x=a_1, MV_P1[LS.x(m), LS.y(m)].y=a_2, m=[1, Length_P1] in which Length_P1 is the number of pixels on B_2[4,3].

After the above, the process finishes the motion calculation for the second type of boundary in P1. The process can then calculate the motion of second type boundary for CF in the same way. Finally, in P1 and CF, the process can get the motion for all boundaries.

Module 36 will generate the pixel level and block level layer information based on the boundary. The layer information will further be used in the motion and frame interpolation. First, the process will automatically generate the pixel level layer information based on the boundary. The tool provides a very flexible method in layer mask generation which can deal with complex pattern. The pixel level layer generation algorithm is based on recursive strategy. To illustrate the strategy, the discussion illustrate a complex condition in FIG. 12. In FIG. 12 on the left, the block object is in the first layer. In the right side of FIG. 12, the first layer object boundary is shown in black with white fill, and the gray to define the second layer object boundary, the user or process will edit the object boundary as in FIG. 12 right in module 30.

After the module 36 of FIG. 4 gets the edited image as on the right FIG. 12, it will automatically analyze the object shape as follows. The tool will analyze the object layer information from the first layer to the last layer. It will continue until all layers have been analyzed. To analyze each layer, for example, the tool may first scan from the first line to the last in the way illustrated in FIG. 13 on the left. For each line, the process searches in two directions, from left to right and from right to left. During the search in the two directions for each line, the process will stop when it reach the object boundary of the current analyzed layer. For example, in FIG. 13, the process is analyzing the first layer information, so the search will stop when it reaches the boundary of the black out lines on the left side of FIG. 13. During the process, the scanned pixel is set the last layer, background layer, information. After this process, the pixels with the last layer, second layer in this example, are illustrated in the gray color as its layer information in FIG. 13 on the right. While a gray color is used, for example, in the tool to display the information, the layer information is represented by number in text file exactly.

The process will then use a recursive strategy to further refine the layer information. The recursive strategy is used to deal with the concave object. The recursive algorithm is run in two directions: first from top to bottom and then from bottom to top. For purposes of discussion, the example will use the top to bottom direction. The process scans from the second line to the last line from top to bottom. When the process scans the pixels in line k (k>=2), if a pixel has no layer information yet and the pixel is not a boundary pixel, the process will check its upper pixel. If its upper pixel has layer information, the process will copy the same layer information to the current pixel. FIG. 14 shows the above process from (a) to (d), in which the hatched pixels represent boundary pixels, and the gray pixels are those with layer information.

After the above process for all the pixels in the line k, the process will do a propagation process to propagate the recursively obtained layer information in the whole line. The process will first search from left to right, if the current pixel has no layer information yet and the pixel is not a boundary pixel and its left pixel has layer information, the process will copy the same layer information to the current pixel. FIG. 14 (c) shows the above process. Finally the process searches from right to left to get FIG. 14 (d).

The bottom to top process is done in the same way. After employing the recursive strategy, the process can get the first layer information shown in FIG. 15 on the left. In which the gray color shows all the pixels inside the first layer blue boundary. After the process finishes the layer information calculation for the first layer, the process goes back to deal with the second layer in the same way until all the layers are processed. The boundary color for the second layer is gray and after the process, the layer information is shown in FIG. 15 on the right.

After all the single layer information is calculated, the tool integrates the layer information automatically. For example, the first layer information in FIG. 15 should not include the second layer information inside itself. After the automatically layer analysis and integration, the process then gets the final layer information in FIG. 16 on the left. In which gray color represents the first layer, and the white triangle with hatching represents the second layer and the gray color represents the background layer. The process can further define the background layer as the second layer and correctly produces FIG. 16.

Module 38 does the block level object motion calculation based on the boundary motion calculated in module 32, 34 and the pixel level layer information calculated in module 36. The process is done in order from the first layer to the last layer. For purposes of this discussion, the process takes the first layer as an example.

In the block level layer information calculation, the process should first define the block size as M*N, where M and N are greater than or equal to one. For each block, the process searches every pixel inside it and if at least one pixel belongs to the first layer, the process sets the block layer information as the first layer.

Figure 17:
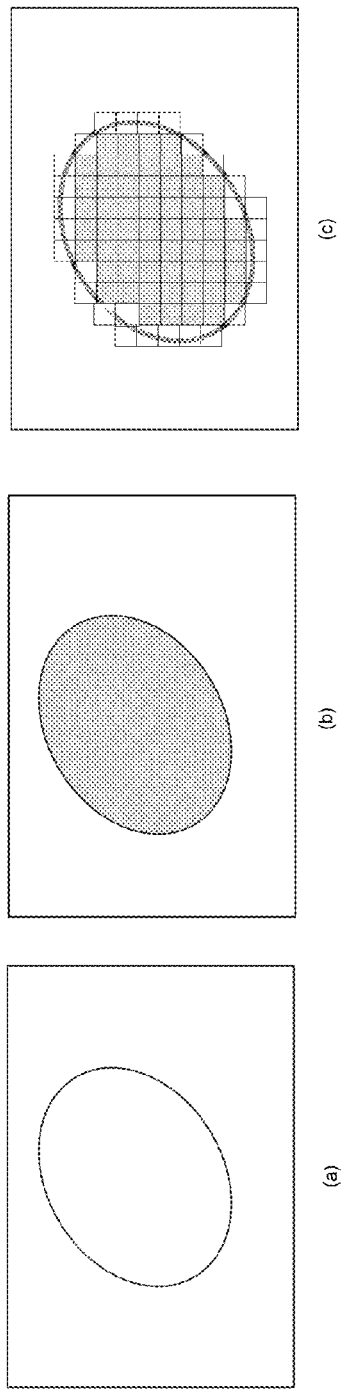
FIG. 17 shows a graphical representation of an object having boundary blocks.

The block level motion calculation is divided into two steps. The first process is to calculate the block motion at the object boundary as illustrated in FIG. 17. FIG. 17 (a) shows the object boundary the user defined in module 30. FIG. 17 (b) shows the pixel level layer information generated in module 36. FIG. 17 (c) shows the block level layer information generated in module 38. The process can find that the tool further divides the first layer block into two types. The first type is shown as blocks, these blocks include the user defined object boundary in FIG. 17 (a) and are called boundary blocks. Other blocks are called internal blocks.

After the block level information has been calculated, module 38 will calculate the block level motion for these blocks. The block motion calculation is separately carried out for the two types of blocks.

For the boundary blocks, at least one boundary pixel is included in them. As the process has calculated all the pixel motion for the defined boundary in module 32 and module 34, the block motion calculation is very simple for boundary blocks by calculating the average motion of all boundary pixels included in the boundary block.

Figure 18:
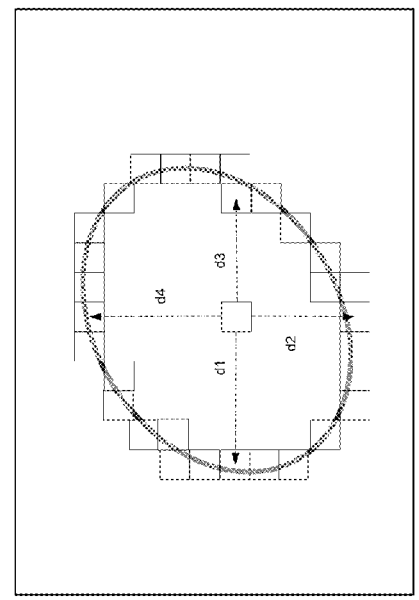
FIG. 18 shows an embodiment of a method of searching for boundary blocks in an object.

The motion for the internal blocks can be interpolated by the motion of boundary blocks. As shown in FIG. 18, for an internal block, to calculate its motion, the process should search in four directions until it reaches a boundary block. The distances between the internal block and boundary block in four directions are d1, d2, d3, d4 and the corresponding motions of the four boundary block are mv1, mv2, mv3, mv4. The motion of the internal block can be interpolated by the above information as follows:

$$mv.x=(mv1.x*(1/d1)+mv2.x*(1/d2)+mv3.x*(1/d3)+mv4.x*(1/d4))/\text{weight}$$

$$mv.y=(mv1.y*(1/d1)+mv2.y*(1/d2)+mv3.y*(1/d3)+mv4.y*(1/d4))/\text{weight}$$

$$\text{weight}=1/d1+1/d2+1/d3+1/d4.$$

The above formula shows how the process can interpolate the internal block by the boundary block. The weight of the boundary block motion is inversely proportional to the distance between internal block and boundary block. While the discussion has indicated previously that the object definition should be based on the motion model boundaries, the actual motion is determined by the boundaries themselves and there can be errors in the drawing of the boundaries which results in errors in the motion vectors. To reduce the errors, when all the motion of the internal blocks has been interpolated, the process can further use a layer based L*K filter to smooth the motion. The layer based filter is done by finding all the L*K neighbors which have the same layer information of current block and calculate the average motion as the filtered results for current block. Because the motion of the L*K neighboring blocks in the same layer should belong to the same affine or translational motion model, an average or low pass filter will not introduce a wrong motion vector.

Figure 19:
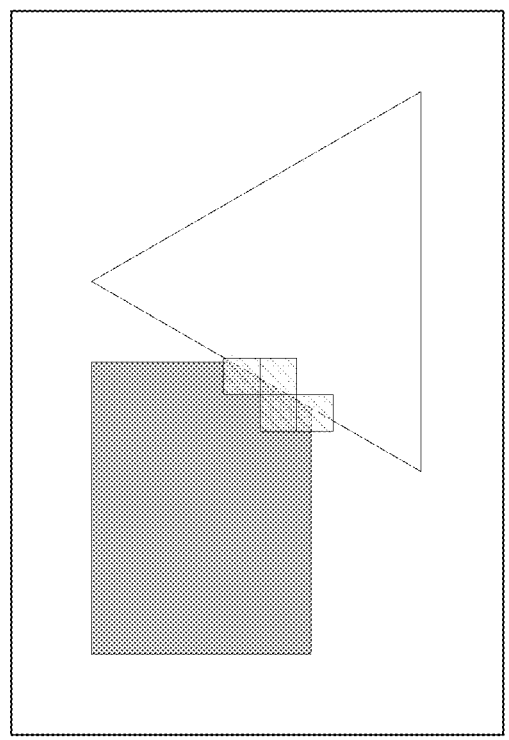
FIG. 19 shows an embodiment of boundary blocks between two objects.

After the process has interpolated all the internal blocks, it finishes the block motion calculation for the first layer. The process will continue to deal with other layers in the same way. When all the layers have been calculated, the process will integrate all the layers together and generate a final block level result. Some blocks are calculated more than once for its layer and motion information as illustrated in FIG. 19. In FIG. 19, because the hatched blocks have both first layer pixels and second layer pixels inside it, the layer and motion of these hatched blocks will be calculated two times: once in the first layer and once in the second layer.

For these blocks, the integration is done in the following way. The process will search all of calculated layer information and block motion and takes the layer information and block motion of the front most layer as final result for the block. As in FIG. 19, for the hatched blocks, the calculated layer and motion of the first layer will be taken as its final result.

Finally, the output of module 38 is the block level motion and layer information of both original frame P1 and CF for a frame interpolation or other motion compensated application. In this manner, the true motion editing tool creates much more accurate motion for interpolation based upon the boundaries of objects and allows for adjustments as needed.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of generating motion vectors for image data, comprising:
    identifying boundaries of at least one object in original frames of image data, wherein the original frames include a current frame and an adjacent frame;
    matching points on the boundaries of the object in the current frame to find corresponding points in the adjacent frame of image data to identify the boundaries of the object in the adjacent frame of image data;
    performing object motion analysis for each pixel on the identified boundaries with respect to the motion of the boundary using any motion between the boundaries of the object in the current and adjacent frame of data, producing pixel-level motion;
    performing pixel-level motion layer generation;
    using the object motion analysis, pixel level motion and the pixel-level motion layers to generate motion for blocks in the image data; and
    producing block level motion information and layer information for the original frames of image data.

2. The method of claim 1, wherein identifying the boundaries comprises identifying a layer to which the object belongs.

3. The method of claim 1, wherein identifying the boundaries comprises identifying the boundaries as one of either a cover/uncover boundary or a double confirmed boundary.

4. The method of claim 1, wherein identifying the boundaries comprises identifying at least one boundary as a double confirmed boundary and identifying matching points for the boundary.

5. The method of claim 4, further comprising defining a line in a previous frame and matching the line in the current frame.

6. The method of claim 5, further comprising determining motion of the pixels in the line in the previous frame and determining motion of the pixels in the matching line in the current frame.

7. The method of claim 1, wherein identifying the boundaries comprises identifying at least one boundary as a cover/uncover boundary and identifying to what object the cover/uncover boundary belongs.

8. The method of claim 7, further comprising:
acquiring motion vectors for portions of the object that are not in the cover/uncover boundary in the previous frame;
selecting a motion model for the object in the previous frame; and
applying the motion model to the cover/uncover boundary.

9. The method of claim 1, wherein performing pixel-level motion layer generation comprises analyzing each pixel in a frame of image data to assign layer information to the block.

10. The method of claim 1 wherein using the object motion analysis and the pixel-level motion layers to generate motion for blocks in the image data comprises:
dividing the image data into blocks;
setting block layer information to a current motion layer if any pixel inside the blocks belongs in the current motion layer;
defining blocks as boundary blocks if the blocks contain boundary pixels for an object, and averaging motion vectors for all of the boundary pixels in the current motion layer to produce a motion vector for the block; and
defining blocks as internal blocks if the blocks contain pixels internal to the object, and interpolating motion vectors for the internal blocks from the motion of the boundary blocks.

11. The method of claim 1, wherein performing block level motion estimation comprises:
generating motion vectors for each block; and
filtering the motion vectors to smooth the motion information.

* * * * *